United States Patent
Gouby et al.

(10) Patent No.: US 10,060,831 B2
(45) Date of Patent: Aug. 28, 2018

(54) METHOD FOR ASSESSING WHETHER OR NOT A MEASURED VALUE OF A PHYSICAL PARAMETER OF AN AIRCRAFT ENGINE IS NORMAL

(71) Applicant: SAFRAN AIRCRAFT ENGINES, Paris (FR)

(72) Inventors: Aurelie Gouby, Moissy-Cramayel (FR); Valerio Gerez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/129,279

(22) PCT Filed: Mar. 26, 2015

(86) PCT No.: PCT/FR2015/050785
§ 371 (c)(1),
(2) Date: Sep. 26, 2016

(87) PCT Pub. No.: WO2015/145085
PCT Pub. Date: Oct. 1, 2015

(65) Prior Publication Data
US 2017/0176292 A1 Jun. 22, 2017

(30) Foreign Application Priority Data
Mar. 27, 2014 (FR) ...................... 14 52650

(51) Int. Cl.
*G01M 15/14* (2006.01)
(52) U.S. Cl.
CPC .................... *G01M 15/14* (2013.01)

(58) Field of Classification Search
CPC ........................... G05B 23/0254; G01M 15/14
See application file for complete search history.

(56) References Cited

U.S. PATENT DOCUMENTS

| 2005/0049832 A1 | 3/2005 | Gorinevsky |
| 2007/0119242 A1* | 5/2007 | Buck ..................... F02D 41/222 73/114.73 |

(Continued)

FOREIGN PATENT DOCUMENTS

FR    2 983 528 A1    6/2013

OTHER PUBLICATIONS

International Search Report dated Jun. 12, 2015, in PCT/FR2015/050785 filed Mar. 26, 2015.

*Primary Examiner* — Kyle R Quigley
(74) *Attorney, Agent, or Firm* — Oblon, McClelland, Maier & Neustadt, L.L.P.

(57) ABSTRACT

A method for assessing whether or not the character of a value, measured by a sensor, of a physical parameter of a device is normal. The method includes implementing steps of calculating, on the basis of a regression model associated with the plurality of pairs, an estimated value of the physical parameter; calculating a related remainder calculating, on the basis of a variance model related to the plurality of pairs, an estimated value of a variance in the physical parameter; calculating an anomaly score of the measured value on the basis of the remainder, calculating the estimated value of the variance, and calculating a mean remainder value for the plurality of pairs; comparing the anomaly score of the measured value with a standard deviation threshold; and if the anomaly score is greater than the threshold, identifying the measurement as abnormal on the interface.

13 Claims, 9 Drawing Sheets

(56) References Cited

U.S. PATENT DOCUMENTS

| | | | |
|---|---|---|---|
| 2008/0245050 A1* | 10/2008 | Wollenweber | F02C 6/02 60/39.15 |
| 2009/0030752 A1* | 1/2009 | Senturk-Doganaksoy | G06Q 10/04 705/7.41 |
| 2013/0179097 A1 | 7/2013 | Masse et al. | |

* cited by examiner

• Stabilized points
— Model

Remainders

● Abnormal stabilised point
— Model
--- Confidence tube

METHOD FOR ASSESSING WHETHER OR NOT A MEASURED VALUE OF A PHYSICAL PARAMETER OF AN AIRCRAFT ENGINE IS NORMAL

GENERAL TECHNICAL FIELD

The present invention relates to the field of tests of aeronautical equipment.

More precisely, it relates to a method for estimating whether or not a measured value of a physical parameter of a device, in particular of an aircraft engine, is normal.

STATE OF THE ART

A test bench is a platform for measuring the performance of a test machine (typically an aircraft engine) during tests under controlled conditions in order to observe its behavior. Many data are acquired during such tests by sensors equipping the bench and/or the test machine, to be transferred into a dedicated database, also called a test database and called a test base hereinafter. For the sake of simplicity, this will be referred to as bench sensors, hence including the sensors equipping the engine within the scope of tests.

A test machine is generally either a prototype being developed so that it is desired to be tested (the acquired data are accordingly used by research departments to improve the machines and develop them), or a finished product for which it is desired to check the specifications and reliability (the acquired data are accordingly used by the quality teams). Alternatively, the test machine can be either a full engine, either a component of an engine for partial tests.

However, as a result of defects of one or more sensors of a bench and/or the test machine, as frequently happens, acquired data have abnormal or aberrant values. The test database is then found "polluted" by these data obtained during a "failing" acquisition.

This raises a problem for users of the base (in particular the research departments), which use all the data stored to make in particular performance comparisons. These data can also be used to readjust numerical models of the engine on the bench.

In addition during the test itself, it is important to quickly detect any defective sensor, in so far as the decision to stop the test can be made depending on the seriousness of the anomaly. Indeed, the tests are very expensive and it is thus important to optimise the same and in particular their output.

French patent FR2965915 describes an examplary method for monitoring in real time sensors of a test bench which enables a sensor breakdown to be signalled, but this is incapable of detecting a drift in the measurement quality in itself. In addition, known methods are inextricably linked to the test bench and do not enable abnormal measurements to be a posteriori identified among the measurements stored in the test base.

Therefore, it would be desirable to control reliably, efficiently and reproducibly measurements of parameters related to an engine for easily identifying an aberrant measurement in a set of measurements.

DISCLOSURE OF THE INVENTION

According to a first aspect, the present invention provides a method for estimating whether a value measured by a sensor of a physical parameter of a device is normal for a value of an operation parameter of said device, a plurality of pairs each defining a reference value of the physical parameter for a value of the operation parameter being stored in a database stored on data storage means, the method being characterised in that it comprises implementing by data processing means the steps of:

(a) calculating on the basis of a regression model related to said plurality of pairs an estimated value of the physical parameter for the value of the operation parameter;

(b) calculating a related residual;

(c) calculating on the basis of a variance model related to said plurality of pairs an estimated value of a variance of the physical parameter for the value of the operation parameter;

(d) calculating an anomaly score of the measured value on the basis of the residual, the estimated value of the variance, and a mean residual value for said plurality of pairs;

(e) comparing the anomaly score of the measured value with a standard deviation threshold;

(f) if the anomaly score is higher than said threshold, signalling the measurement as abnormal on interface means.

The estimation of the variance on the basis of the operation parameter enables a variation in the measurement uncertainty (depending on the context of use) to be dispensed with. The confidence interval built (tolerance σ on the $Z_{score}$) about the regression model is thus more realistic than a constant variance and the detection of abnormal points is all the more accurate. The alarm model is thus more efficient.

According to other advantageous and non-limiting characteristics:

the method comprises a prior phase of processing said plurality of pairs of the database, comprising implementing by data processing means the steps of:

(a0) determining said regression model related to said plurality of pairs by a regression modelling the value y of the physical parameter on the basis of the value x of the operation parameter from the set $\{x_i;y_i\}_{i \in [1,n]}$, where $x_i;y_i$ designates the values of a pair stored in the database;

(a1) for each of the pairs, calculating an estimated value of the physical parameter and a related residual;

(a2) calculating the mean of said residuals;

(a3) calculating on a w-sized sliding window a set of values of residual variance each related to a value of the operation parameter of a pair;

(a4) determining said variance model related to said plurality of pairs by a regression modelling the value var of the residual variance on the basis of the value x of the operation parameter from the set $\{x_j;var_j\}_{j \in [1,n-w+1]}$, where $var_j$ designates a calculated residual variance value and $x_j$ the value of the related operation parameter;

the prior phase comprises a step (a5) of determining on the basis of said determined variance model a confidence region about said determined regression model, and displaying on the interface means said confidence region;

the confidence region is defined by an upper bound of the formula $f(x)+\sigma \times \sqrt{g(x)}$, and a lower bound of the formula $f(x)-\sigma \times \sqrt{g(x)}$, where f represents the regression model and g represents the variance model;

the anomaly score is obtained by the formula $$Z_{score} = \left| \frac{res_{exec} - \text{mean}}{\sqrt{\widehat{var}_{exec}}} \right|,$$

where $res_{exec}$ is the residual related to the measured value of the physical parameter, $\widehat{var}$ the estimated value of the variance, and mean is the mean residual value for said plurality of pairs;

said device is an aircraft engine;

said physical parameter is chosen from a pressure, a temperature, a fluid flow rate, and a noise level, related to the engine;

said operation parameter is chosen from a speed and a fuel flow rate related to the engine;

the engine is disposed in a test bench comprising the sensor, the step (e) comprising shutting down the test bench if the measurement is signalled as abnormal;

step (e) comprises adding the pair formed by the measured value of the physical parameter and by the value of the operation parameter related to said database of pairs if the measurement is not signalled as abnormal.

According to a second aspect, the invention relates to an equipment for estimating whether a value measured by a sensor of a physical parameter of a device is normal for a value of an operation parameter of said device, comprising data processing means, data storage means storing in a database a plurality of pairs each defining a reference value of the physical parameter for a value of an operation parameter, and interface means, the equipment being characterised in that the data processing means are configured to implement:

a module for calculating on the basis of a regression model related to said plurality of pairs an estimated value of the physical parameter for the value of the operation parameter;

a module for calculating a related residual;

a module for calculating on the basis of a variance model related to said plurality of pairs an estimated value of a variance of the physical parameter for the value of the operation parameter;

a module for calculating an anomaly score of the measured value on the basis of the residual, the estimated variance value, and a mean residual value for said plurality of pairs;

a module for comparing the anomaly score of the measured value with a standard deviation threshold;

a module for transmitting an alarm signal on the interface means signalling the measurement as abnormal if the anomaly score is higher than said threshold $\sigma$.

According to other advantageous and non-limiting characteristics:

the data processing module is further configured to implement:

a module for determining said regression model related to said plurality of pairs by a regression modelling the value y of the physical parameter on the basis of the value x of the operation parameter from the set $\{x_i; y_i\}_{i \in [1,n]}$ where $x_i; y_i$ designates the values of a pair stored in the database;

a module for calculating for each of the pairs a related estimated value of the physical parameter and a related residual;

a module for calculating the mean of said residuals;

a module for calculating on a w-sized sliding window a set of values of residual variance, each related to a value of the operation parameter of a pair;

a module for determining said variance model related to said plurality of pairs by a regression modelling the value var of the residual variance on the basis of the value x of an operation parameter from the set $\{x_j; var_j\}_{j \in [1, n-w+1]}$, where $var_j$ designates a calculated residual variance value and $x_j$ the value of the related operation parameter.

According to a third aspect, the invention relates to a system comprising:

a test bench comprising a sensor and adapted to receive a device;

an equipment according to the second aspect of the invention for estimating whether a value measured by the sensor of a physical parameter of said device is normal or not for a value of an operation parameter of said device.

According to a fourth and a fifth aspect, the invention relates to a computer program product comprising code instructions for carrying out a method according to the first aspect of the invention for estimating whether or not a measured value by a sensor of a physical parameter of a device is normal for a value of an operation parameter of said device; and a storage mean readable by a computing equipment on which a computer program product comprises code instructions for carrying out a method according to the first aspect of the invention for estimating whether or not a value measured by a sensor of a physical parameter of a device is normal for a value of an operation parameter of said device.

DESCRIPTION OF THE FIG.S

Further characteristics and advantages of the present invention will appear upon reading the description that follows of a preferential embodiment. This description will be given in reference to the appended drawings in which.

DETAILED DESCRIPTION

Figure 1:
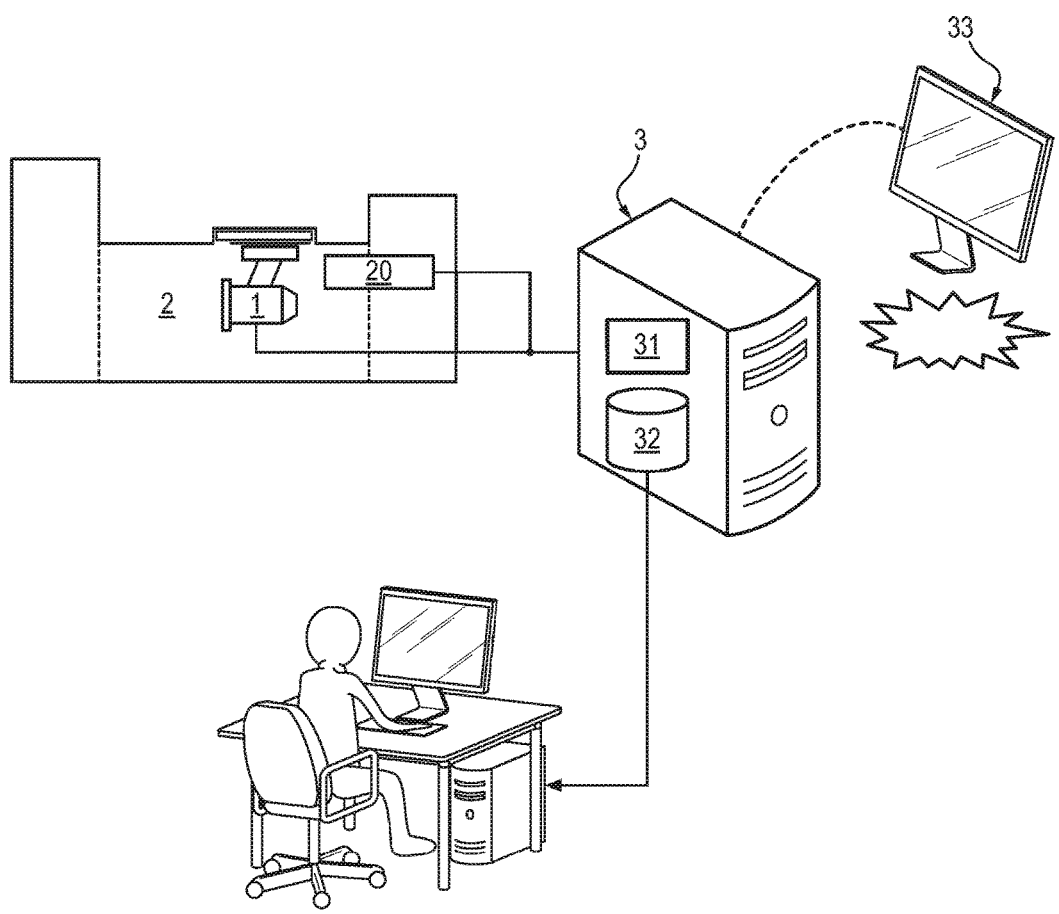
FIG. 1 represents an exemplary environment in which the method according to the invention is implemented.

Referring to FIG. 1, the present method is a method for estimating whether or not a value $y_{exec}$ measured by a sensor 20 of a physical parameter of a controlled device 1 is normal for a value $x_{exec}$ of an operation parameter of said engine 1. The controlled device 1 is in particular an aircraft engine 1, typically all or part of a turbomachine, in particular a double flow turbomachine.

Although the present description will take in the following the preferred example of a turbomachine (in flight or in a test bench), it will however be understood that the invention is not limited thereto, and by "device", it is meant any physical system receiving at least one operation parameter as an "input", that it is necessary to monitor using sensors and the behaviour of which can be complex to model directly. The meaning of test machine is given when the device is being tested for example on a bench (and not in actual use).

The present method can thus be implemented by any propelling device, being terrestrial or not.

Besides propelling systems, it will be readily understood that the present method can find other applications in aeronautics, in particular in landing gear systems, or any other complex equipment device the proper operation of which needs to be monitored.

In another field, for example in the railway field, train breaking systems or any other safety member of a vehicle can be mentioned.

Other manufacturing or experimentation systems can also be covered by the invention.

The present method is applicable to any measurement monitoring (including during the life of the device), but preferably, the example of test measurements will be taken: the engine 1 (or another device) is disposed in a test bench 2 to which the sensor 20 is connected. The test bench 2 is designed to simulate an operation of the engine 1 in actual conditions. The purpose of the present invention is to validate or not a measurement made during a test. Thus, if a measurement is normal or not is directly related to its validity. A measurement declared as invalid will be considered as abnormal.

The operation parameter (value x) is an "explanatory" or "predictive" variable, in opposition to the measured physical parameter (value y) which is a variable "to explain" or "to predict". In other words, the value x of the operation parameter is the cause, whereas the value y of the physical parameter is the consequence.

More precisely, the operation parameter is a controlled value related to the engine 1 on which either a user can act, or the environment has an influence. In other words, this is an input command. In the following of the present description, the engine speed (that is the number of revolutions performed by a rotor of the engine 1 per time unit, often directly called "engine rpm" when the time unit is a minute) will be taken, but it will be understood that many other operation parameters, such as the fuel flow rate injected in the engine 1, a fuel temperature injected in the engine 1, an ambient pressure about the engine 1, and an ambient temperature about the engine 1, can be monitored. This parameter is an input parameter chosen for the engine.

The physical parameter is representative of a characteristic physical quantity of an expected behaviour of the engine 1 in response to the application of the operation parameter, to which physical quantity is adapted the sensor 20. It is understood that a plurality of sensors 20 adapted for different physical quantities can be provided. In particular, this physical parameter can be a pressure at a point of the engine 1, an inner temperature at a point of the engine 1, the fluid flow rate at a point of the engine 1, a noise level generated by the engine 1, a fuel density in the engine 1, etc. Those skilled in the art will choose the type of physical quantity to be measured as a function of the test purposes. In the following of the present description, a pressure measured by a pressure sensor 20 will be taken as an example.

A pair (x;y) designates a point acquisition: for a value x of the operation parameter, a value y of the physical parameter is measured by the sensor 20.

A plurality of pairs $(x_i;y_i)_{i\in[1,n]}$ each defining a reference value $y_i$ of the physical parameter for a value $x_i$ of the operation parameter is stored in a database (which makes up the test database previously discussed) itself stored on data storage means 32. By "reference" values, it is meant that they are acquired during stabilised test phases, that is that they can be considered as normal. Possible abnormal values have already been removed from the base.

The data storage means 32 (which are typically a hard disk) and data processing means 31 (for example a processor) are either those of an equipment 3 connected to the sensor 20 (as represented in FIG. 1) or directly integrated to the test bench 2. The equipment 3 (or another equipment) is equipped with interface means 33 (such as a keyboard and a screen) to interact with the database, and in particular for displaying the results (see below).

The pair $(x_{exec};y_{exec})$ designates the "monitored" measurement, that is that for which it is attempted to determine whether the measured value $y_{exec}$ is normal or not.

This monitored measurement can be either a measurement obtained in real time (in particular in an operation during the life of the engine) or even a measurement in delayed time (pair $(x_{exec};y_{exec})$ already stored in the database and in standby).

There can be a system for inquiring and analysing the test database in real time implemented by the data processing means 31.

Learning Phase

The present method comprises two phases. The first is a learning phase and the second is a running phase. Preferably, the learning phase is implemented previously so as to create models that will be described below (and possibly store them on the data storage means 32), and the running phase is then implemented at each new acquisition of a measurement. It is the running phase that makes it possible to estimate whether a measured value $y_{exec}$ is normal or not, which is the object of the invention. The learning phase can be resumed from time to time to update the models.

Alternatively, it is quite possible not to make a prior learning and to determine the models in real time at each implementation of the running phase.

Both phases will be described in the following of the present description.

The learning phase can be seen as a set of steps of processing only the data of the base (i.e. independently of the pair $(x_{exec};y_{exec})$).

Figure 2A:
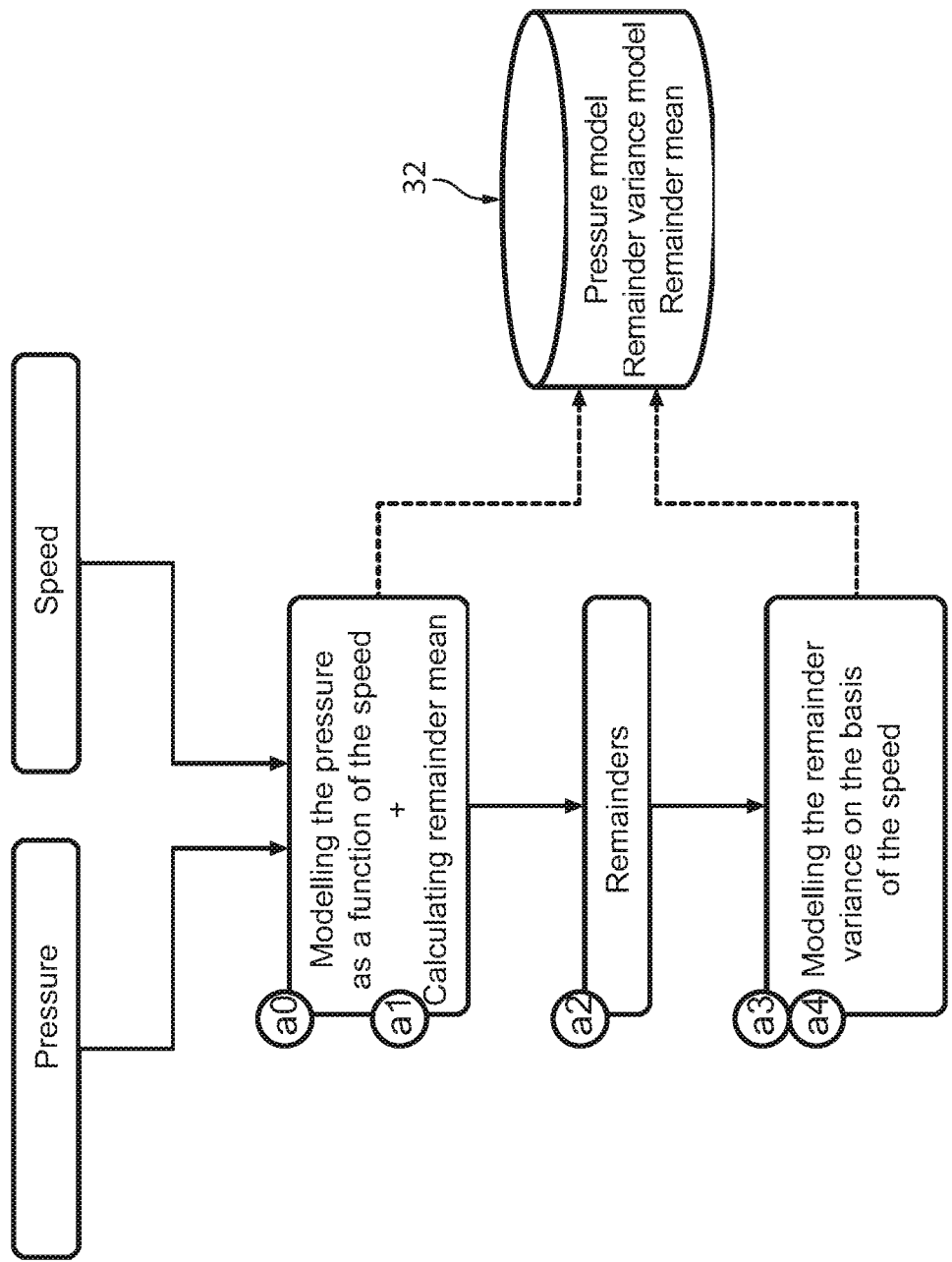
FIGS. 2a-2b illustrate the steps of two phases of an exemplary method according to the invention.

Referring to FIG. 2a (which uses the example of the speed/pressure parameters), the learning phase starts with a step (a0) of determining a regression model related to said plurality of pairs $(x_i;y_i)_{i\in[1,n]}$ by a regression modelling y as a function of x on the set of the values of the pairs $(x_i;y_i)_{i\in[1,n]}$. This regression model will be used in the running phase.

The regression designates a set of statistical methods well known to those skilled in the art to analyse the relationship of a variable (herein y) relative to one or more other ones (herein x). Step (a0) consists in other words in determining a function f enabling the values $y_i$ to be best approximated on the basis of values $x_i$, for a given link type. Linear, polynomial, exponential, logarithmic regressions, etc. are known as well.

The choice of the link type used is advantageously made as a function of the curve shape and can be automatically made by optimisation by maximising a determination coefficient, for example the way described in patent application FR2939928.

Figure 3A:
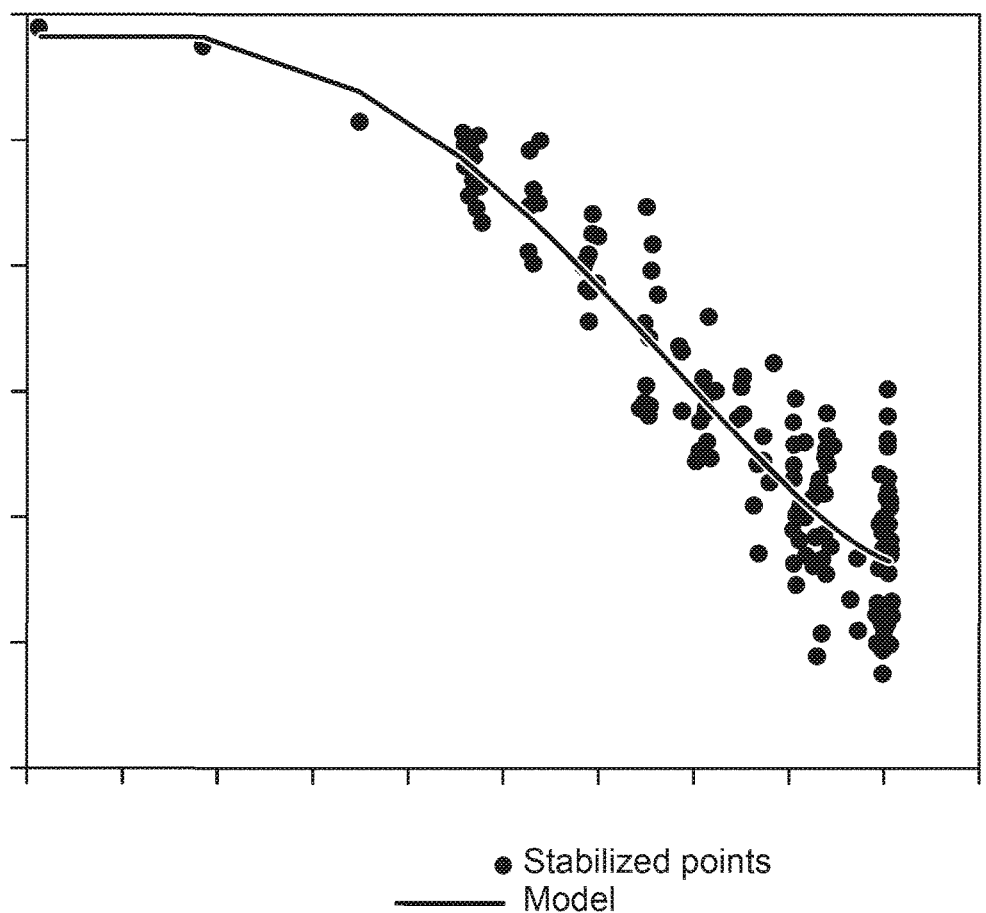
FIGS. 3a-3f represent displayed areas on a data interface obtained during different steps of the method according of the invention.

FIG. 3a illustrates the scatter plot formed by the n pairs $\{x_i;y_i\}_{i\in[1,n]}$ and the model obtained by regression.

Figure 3B:
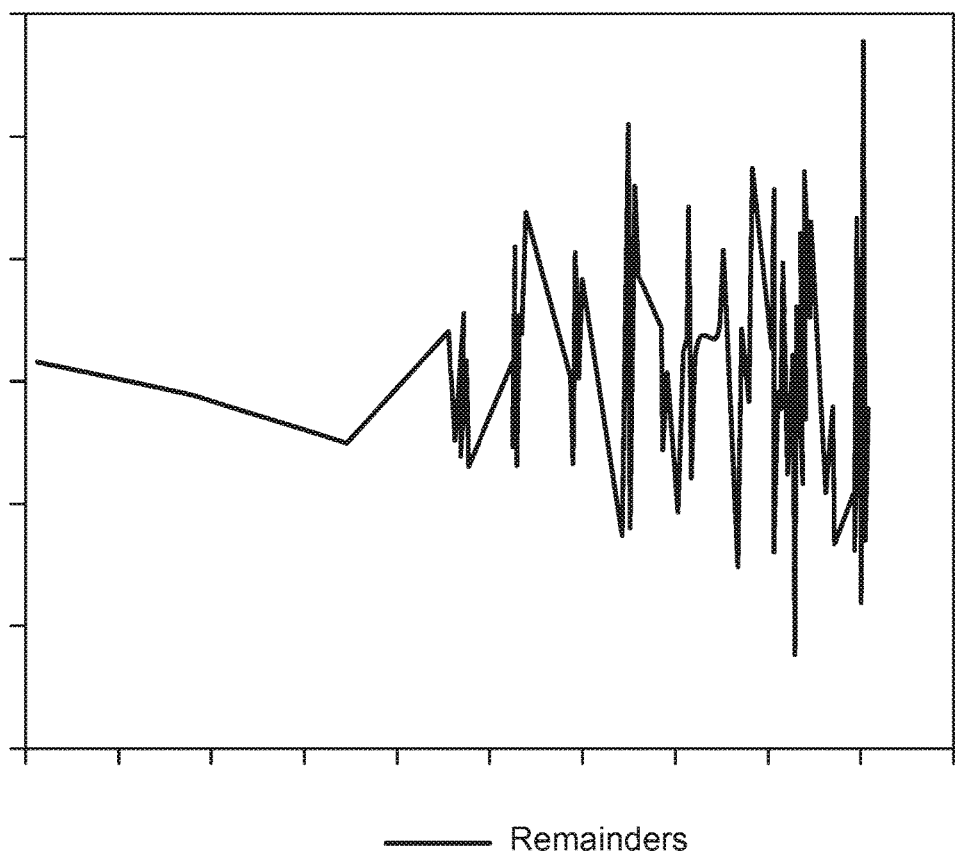

In a second step (a1), the learning phase comprises calculating, for each of the pairs, an estimated value $\hat{y}_i$ of the physical parameter and a residual $res_i$ being related to each other. The residual is the difference between an estimated value and a measured value. From the regression model, these values are simply obtained by the formulae $\hat{y}_i=([f(x)]_i)$, and $res_i=y_i-\hat{y}_i$, for $i\in[1,n]$. FIG. 3b illustrates the residuals obtained for the model.

In a step (a2), the mean of said residuals is calculated:

$$\text{mean} = \frac{1}{n}\sum_{i=1}^{N} res_i.$$

Once the regression model is created, the data processing means 31 determine another model used in the running phase: this is the variance model.

This model also related to said plurality of pairs $(x_i;y_i)_{i\in[1,n]}$ is typically calculated in two consecutive steps. In a step (a3) a set of values $(var_j)_{j\in[1,n-w+1]}$ of residual variance is calculated, which set of values will enable a regression in step (a4) to be implemented in order to obtain the variance model.

In a known manner, the variance is calculated as the squared residual mean. Obtaining a plurality of variance values is made by virtue of a w-sized "sliding window" (w is a predetermined parameter of the algorithm, it is preferably chosen of a sufficient size to avoid a problem of flaring the confidence tube, see below. By way of example, 10% of the number of samples can be taken). More precisely, for each variance value $var_j$, is calculated a subset (indices j to j+w−1) of the set of pairs $(x_i;y_i)_{i\in[1,n]}$. In particular, $$\mathrm{var}_j = \frac{1}{w-2} \sum_{i=j}^{j+w-1} (res_i)^2.$$

Similarly to what is made in step (a0), the variance model related to said plurality of pairs $(x_i;y_i)_{i\in[1,n]}$ is determined in step (a4) by a regression modelling var as a function of x. In other words, in this step, the data processing means 31 determine the function g such that $\widetilde{var}_j = g(x_j)$, for $j\in[1,n-w+1]$.

Figure 3C:
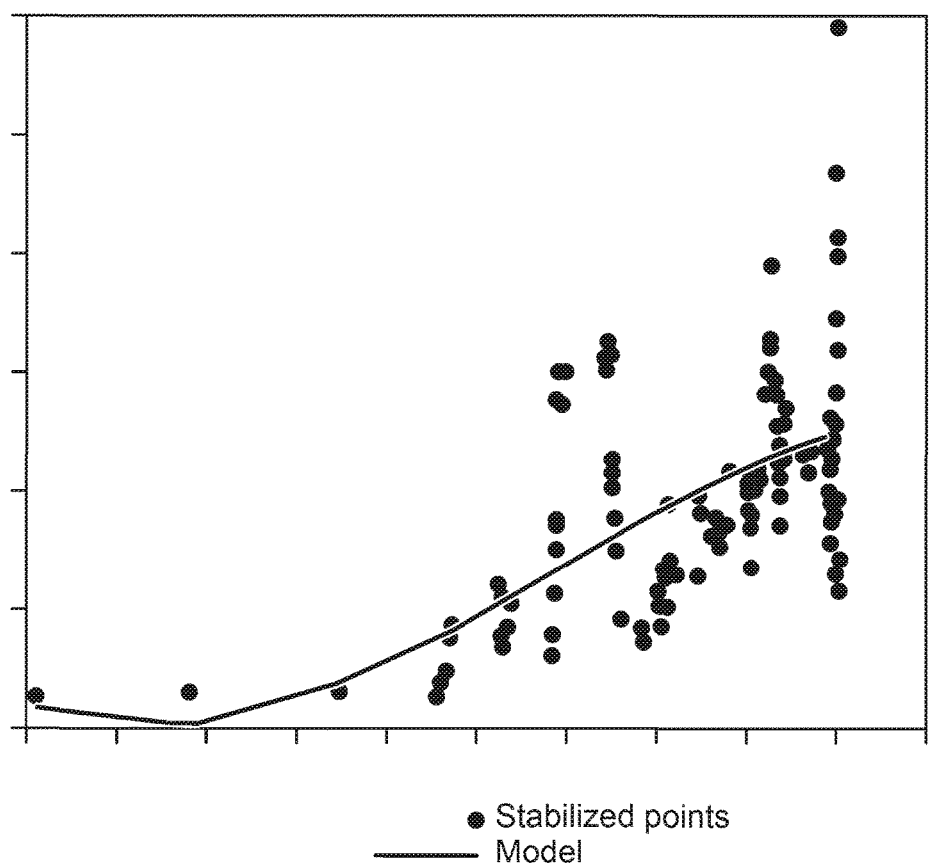

FIG. 3c illustrates the scatter plot formed by the n−w+1 pairs $\{x_j; var_j\}_{j\in[1,n-w+1]}$ and the model obtained by regression.

In an optional step (a5), the learning phase can comprise the definition of a "confidence tube" (i.e. a confidence region) about the regression model. This tube consists of an upper bound and a lower bound. Between both theses bounds, a point related to a pair (x;y) is considered as normal, and not outside, as will be seen below.

The confidence tube is defined by an amplitude deviation $\|\sigma\times\sqrt{g}\|$ relative to the regression model, or a standard deviation threshold σ (see below). As explained before, this tube defines a confidence interval being a function of the variance, which increases the realism of the results: the number of false negatives and false positives is substantially reduced.

The equation of the upper bound is given by the formula $f(x)+\sigma\times\sqrt{g}$, and that of the lower bound by the formula $f(x)-\sigma\times\sqrt{g}$.

Figure 3D:
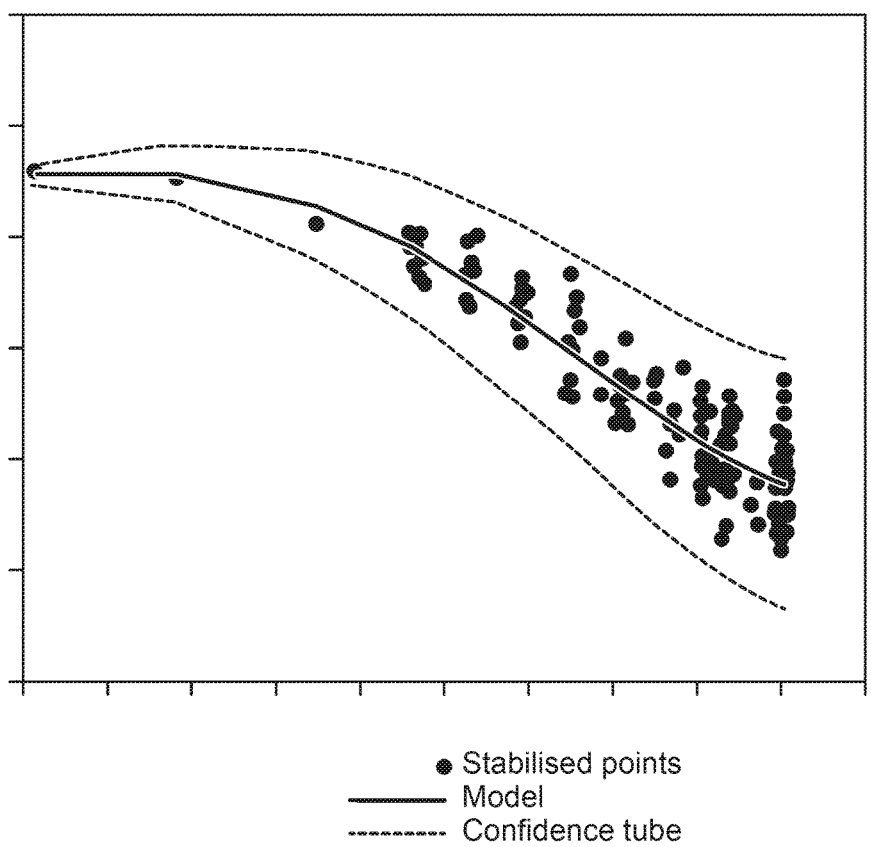

The confidence tube is preferably added to a representation of the scatter plot formed by the n pairs $(x_i;y_i)_{i\in[1,n]}$ and the model obtained by regression (of the type of FIG. 3a) so as to yield FIG. 3d. As will be seen below, this tube enables the result of the running phase to be anticipated and whether or not a measurement is normal to be illustrated in a very visual way (and comprehensive way including for those non skilled in the art).

Figure 3E:
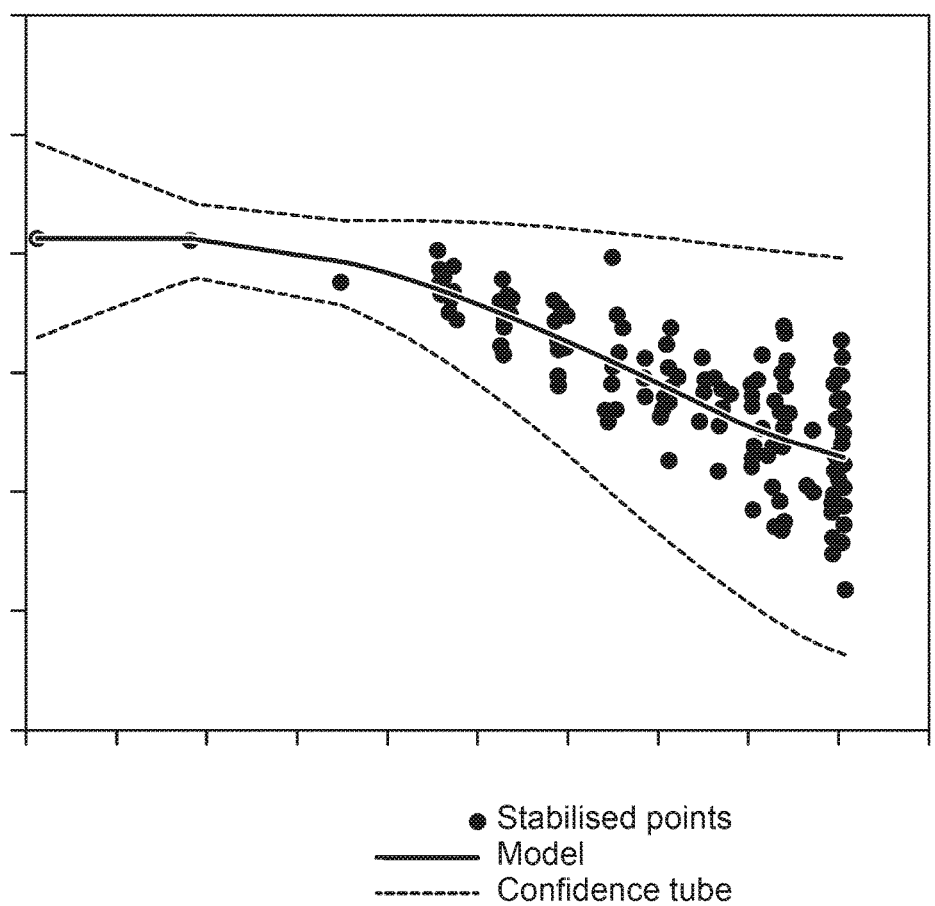

It will be noted that the distribution of the points $(x_i;y_i)_{i\in[1,n]}$ is not equal depending on the parameter x. In the example where the operation parameter is the speed, there is indeed much more measurements at a high speed than at a low speed. This unequal distribution can cause a flaring of the confidence tube at its origin, as represented in the example of FIG. 3e, if the parameter w is poorly chosen.

Preferably, the parameter w is chosen sufficiently high such that the function g is increasing. For this, steps (a3) then (a4) can be iteratively repeated with increasing values of w until this condition is met.

Running Phase

As previously explained, the learning phase represents a preparatory work for speeding up the running phase (which corresponds to the core of the present method according to the invention). The learning phase can alternatively be made "at the same time" as the running phase. In the description of this part, reference will be made to all the previously described related formulae.

This phase makes it possible to estimate whether or not a measured value $y_{exec}$ of the physical parameter for a value $x_{exec}$ of the operation parameter is normal.

Figure 2B:
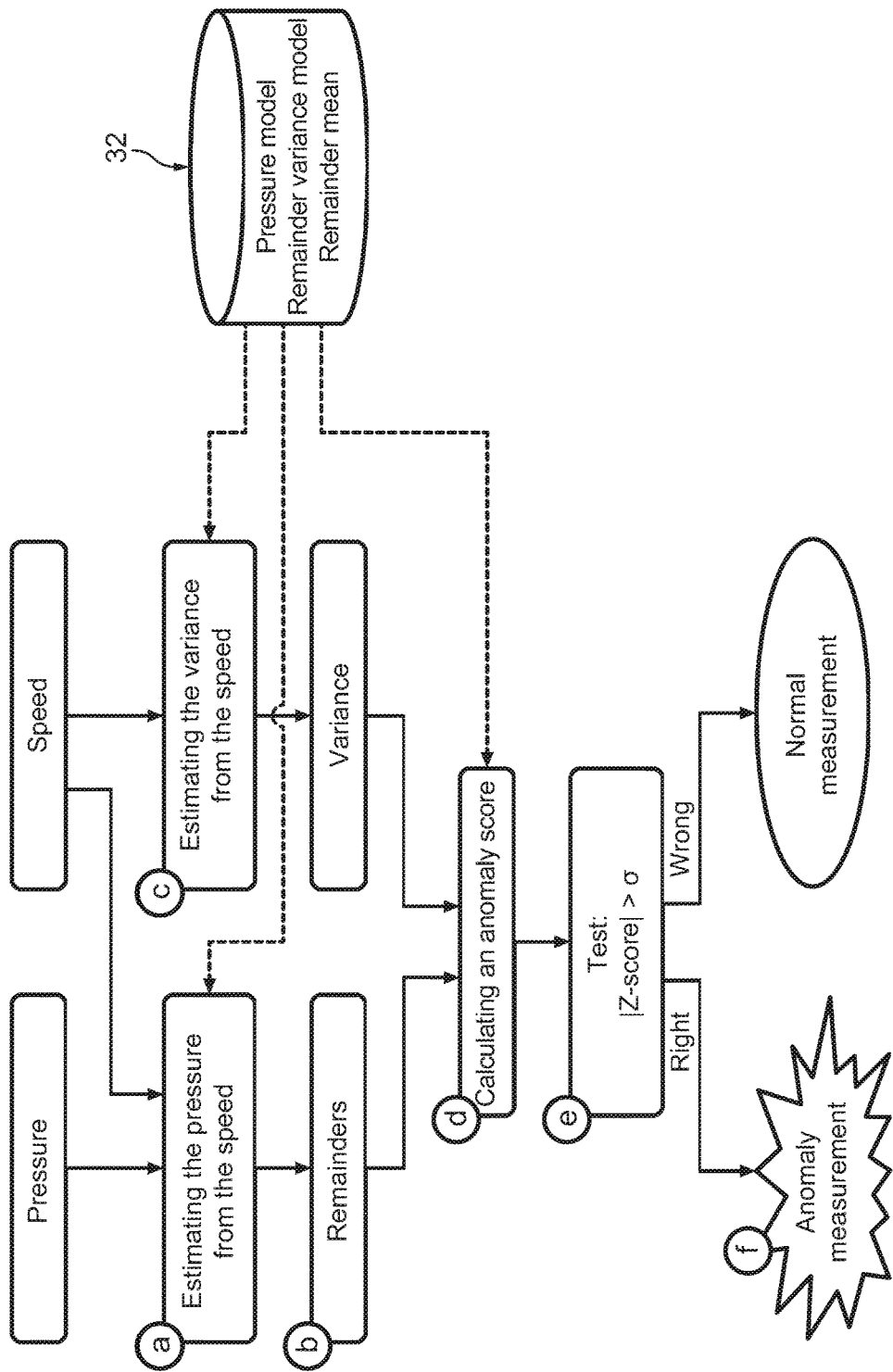

This phase is illustrated by FIG. 2b. If the learning phase has been implemented previously, the models can be loaded from the data storage means 32, as illustrated in this Fig.

In a step (a), an estimated value $\hat{y}_{exec}$ of the physical parameter is calculated for the value $x_{exec}$ of the operation parameter on the basis of the regression model related to said plurality of pairs $(x_i;y_i)_{i\in[1,n]}$ (model possibly determined in the learning phase). This calculation is made as previously explained by the formula $\hat{y}_{exec}=[(f(x)]_{exec})$.

In the following step (b), the related residual $Res_{exec}$ is calculated: $res_{exec}=y_{exec}-\hat{y}_{exec}$.

In step (c) (which can be made with either or both of steps (a) and (b)), an estimated value $\widetilde{var}$ of the variance of the physical parameter is calculated for the value $x_{exec}$ of the operation parameter on the basis of the variance model related to said plurality of pairs $(x_i;y_i)_{i\in[1,n]}$ (model possibly determined in the learning phase). This calculation is made as previously explained by the formula $\widetilde{var}=[(g(x)]_{exec})$.

The residual, the estimated value $\widetilde{var}$ of the variance, and the residual mean value mean (calculated optionally during the learning phase) for said plurality of pairs $(x_i;y_i)_{i\in[1,n]}$ enable the data processing means to calculate in a step (d) an anomaly score (also called confidence score) $Z_{score}$ of the measured value $y_{exec}$. Preferably, the anomaly score is given by the formula $$Z_{score} = \left| \frac{res_{exec} - \mathrm{mean}}{\sqrt{\widetilde{var}_{exec}}} \right|.$$

The higher this score, the more likely that the measurement is abnormal.

In a step (e), the anomaly score ($Z_{score}$) of the measured value $y_{exec}$ is compared with the previously discussed threshold σ (a threshold expressed as a number of standard deviations, for example three to six standard deviations).

If the anomaly score $Z_{score}$ is higher than said threshold σ, the measurement is signalled as abnormal on the interface 33 in a step (f). An alarm can be triggered if it is a real time test on a test bench 2, and the latter is stopped (the current test is not valid and the anomaly should be analysed before the test bench can be reused). The pair $(x_{exec};y_{exec})$ then is not added to the database, (or deleted if it was waiting for check).

In the opposite case, the measurement is considered as normal, and the pair $(x_{exec};y_{exec})$ joins the reference values of the database. The learning phase can possibly be resumed to update the models.

Preferably, a synthesis report (for example for the research department) is then automatically issued.

Figure 3F:
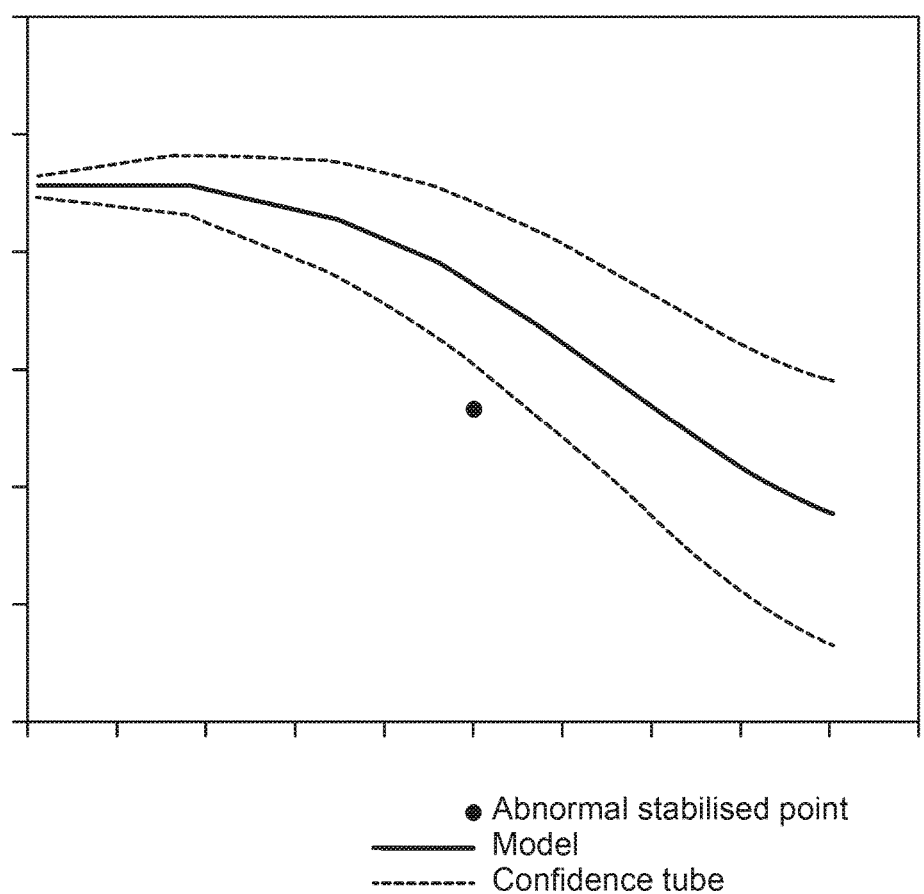

It is to be noted that an abnormal measurement will be represented outside the previously discussed confidence tube, as for example shown in FIG. 3f. In particular, if $Z_{score} > \sigma$, then $|res_{exec}(=y_{exec}-\hat{y}_{exec})-\text{mean}| > \sigma \times \widehat{var}$ (=the half-diameter of the confidence tube), which means that the related point is outside the confidence tube.

Indeed, the residuals obey a normal law with a mean mean. The test (comparison with the $Z_{score}$) consists in determining whether it is likely that the current observation comes from the same law.

If the distribution of the normal law is drawn, it can be seen that beyond six standard deviations, the location is at the distribution tail. The probability to observe something normal beyond this standard deviation threshold is in the order of $10^{-9}$.

Equipment and System

The equipment 3 (represented in FIG. 1) for the implementation of the method just described (estimating whether or not a value $y_{exec}$ measured by a sensor 20 of a physical parameter of a device 1 such as an aircraft engine is normal for a value $x_{exec}$ of an operation parameter of said device 1) comprises data processing means 31, data storage means 32, and interface means 33.

The data storage means 32 store in a database the plurality of pairs $(x_i; y_i)_{i \in [1,n]}$ each defining a reference value $y_i$ of the physical parameter for a value $x_i$ of an operation parameter.

The data processing means 31 are conFig.d to implement:
- a module for calculating on the basis of a regression model related to said plurality of pairs $(x_i; y_i)_{i \in [1,n]}$ an estimated value $\hat{y}_{exec}$ of the physical parameter for the value $x_{exec}$ of the operation parameter;
- a module for calculating a related residual $res_{exec}$;
- a module for calculating on the basis of a variance model related to said plurality of pairs $(x_i; y_i)_{i \in [1,n]}$ an estimated value $\widehat{var}$ of a variance of the physical parameter for the value $x_{exec}$ of the operation parameter;
- a module for calculating an anomaly score $Z_{score}$ of the measured value $y_{exec}$ on the basis of the residual $res_{exec}$, the estimated variance value $\widehat{var}$, and a mean residual value for said plurality of pairs $(x_i; y_i)_{i \in [1,n]}$;
- a module for comparing the anomaly score $Z_{score}$ of the measured value $y_{exec}$ with a standard deviation threshold $\sigma$;
- a module for transmitting an alarm signal on the interface means 33 signalling the measurement as abnormal if the anomaly score $Z_{score}$ is higher than said threshold $\sigma$.

If the equipment 3 also implements the learning phase, then the data processing module 31 is further conFig.d to implement:
- a module for determining said regression model related to said plurality of pairs $(x_i; y_i)_{i \in [1,n]}$ by a regression modelling the value y on the basis of the value x from the set $\{x_i; y_i\}_{i \in [1,n]}$ (this module is possibly conFig.d to store the variance model on the data storage means 32 for a future use);
- a module for calculating for each of the pairs $\{x_i; y_i\}_{i \in [1,n]}$ an estimated value $\hat{y}_i$ of the physical parameter and a residual $res_i$ being related to each other;
- a module for calculating the mean of said residuals $res_i$;
- a module for calculating on a w-sized sliding window a set of values $(var_j)_{j \in [1,n-w+1]}$ of residual variance;
- a module for determining said variance model related to said plurality of pairs $(x_i; y_i)_{i \in [1,n]}$ by a regression modelling var on the basis of x from the set $\{x_j; var_j\}_{j \in [1,n-w+1]}$ (this module is possibly conFig.d to store the variance model on the data storage means 32 for a future use).

The equipment 3 is as preferably explained included in a system further comprising a test bench 2 comprising the sensor 20 measuring the value $y_{exec}$ of the physical parameter and adapted to receive the device 1.

Computer Program Product

According to a fourth and a fifth aspect, the invention relates to a computer program product comprising code instructions for carrying out (on data processing means 31, in particular those of the equipment 3) a method according to the first aspect of the invention for estimating whether or not a value $y_{exec}$ measured by a sensor 20 of a physical parameter of a device 1 is normal for a value $x_{exec}$ of an operation parameter of said device 1, as well as storage means readable by a computing equipment (for example the data storage means 32 of this equipment 3) on which this computer program product is found.

The invention claimed is:

1. A method for estimating whether a value ($y_{exec}$) measured by a sensor of a physical parameter of a device is normal for a value ($x_{exec}$) of an operation parameter of said device, a plurality of pairs $(x_i; y_i)_{i \in [1,n]}$ each defining a reference value ($y_i$) of the physical parameter for a value ($x_i$) of the operation parameter being stored in a database stored on a data storage device, the method comprising implementing by a processor:
   (a) calculating on the basis of a regression model related to said plurality of pairs $(x_i; y_i)_{i \in [1,n]}$ an estimated value ($\hat{y}_{exec}$) of the physical parameter for the value ($x_{exec}$) of the operation parameter, the estimated value ($\hat{y}_{exec}$) of the physical parameter being different for a different value ($x_{exec}$) of the operation parameter;
   (b) calculating a related residual ($res_{exec}$) based on the estimated value ($\hat{y}_{exec}$) of the physical parameter for the value ($x_{exec}$) of the operation parameter;
   (c) calculating on the basis of a variance model related to said plurality of pairs $(x_i; y_i)_{i \in [1,n]}$ an estimated value ($\widehat{var}$) of a variance of the physical parameter for the value ($x_{exec}$) of the operation parameter;
   (d) calculating an anomaly score ($Z_{score}$) of the measured value ($y_{exec}$) on the basis of the residual ($res_{exec}$), the estimated value ($\widehat{var}$) of the variance, and a mean residual value (mean) for said plurality of pairs $((x_i; y_i)_{i \in [1,n]})$;
   (e) comparing the anomaly score ($Z_{score}$) of the measured value ($y_{exec}$) with a standard deviation threshold (a);
   (f) when the anomaly score ($Z_{score}$) is higher than said threshold ($\sigma$), signaling the measurement as abnormal on an interface device; and
   (g) shutting down a test bench comprising the sensor in response to signaling the measurement is abnormal.

2. The method according to claim 1, comprising a prior phase of processing said plurality of pairs $(x_i; y_i)_{i \in [1,n]}$ of the database, comprising implementing by the processor:
   (a0) determining said regression model related to said plurality of pairs $(x_i; y_i)_{i \in [1,n]}$ by a regression modelling the value y of the physical parameter on the basis of the value x of the operation parameter from the set $\{x_i; y_i\}_{i \in [1,n]}$, where $x_i; y_i$ designates the values of a pair stored in the database;
   (a1) for each of the pairs $\{x_i; y_i\}_{i \in [1,n]}$, calculating an estimated value ($\hat{y}_i$) of the physical parameter and a related residual ($res_i$);
   (a2) calculating the mean (mean) of said residuals ($res_i$);
   (a3) calculating on a w-sized sliding window a set of values $(var_j)_{j \in [1,n-w+1]}$ of residual variance each related to a value ($x_j$) of the operation parameter of a pair $(x_j; y_j)_{j \in [1,n-w+1]}$; and
   (a4) determining said variance model related to said plurality of pairs $(x_i; y_i)_{i \in [1,n]}$ by a regression modelling the value var of the residual variance on the basis of the value x of the operation parameter from the set $\{x_j; var_j\}_{j\in[1,n-w+1]}$, where $var_j$ designates a calculated residual variance value and $x_j$ the value of the related operation parameter.

3. The method according to claim 2, wherein the prior phase comprises a step (a5) of determining on the basis of said determined variance model a confidence region about said determined regression model, and displaying on the interface device said confidence region.

4. The method according to claim 3, wherein the confidence region is defined by an upper bound of the formula $f(x)+\sigma \times \sqrt{g(x)}$, and a lower bound of the formula $f(x)-\sigma \times \sqrt{g(x)}$, where f represents the regression model and g represents the variance model.

5. The method according to claim 1, wherein the anomaly score ($Z_{score}$) is obtained by the formula $$Z_{score} = \left| \frac{res_{exec} - \text{mean}}{\sqrt{\widehat{var}_{exec}}} \right|,$$

where $res_{exec}$ is the residual related to the measured value of the physical parameter, $\widehat{var}$ is the estimated value of the variance, and mean is the mean residual value for said plurality of pairs $(x_i; y_i)_{i\in[1,n]}$.

6. The method according to claim 1, wherein said device is an aircraft engine.

7. The method according to claim 6, wherein said physical parameter is chosen from a pressure, an inner temperature, a fluid flow rate, a noise level and a fuel density, related to the engine.

8. The method according to claim 6, wherein said operation parameter is chosen from a speed, a fuel flow rate, a fuel temperature, an ambient pressure and an ambient temperature, related to the engine.

9. The method according to claim 1, wherein the step (e) comprises adding the pair ($x_{exec}$:$y_{exec}$) formed by the measured value of the physical parameter and by the value of the operation parameter related to said database of pairs $(x_i;y_i)_{i\in[1,n]}$ when the measurement is not signaled as abnormal.

10. A non-transitory computer readable medium on which a computer program product comprises code instructions for carrying out the method according to claim 1 for estimating whether the value $y_{exec}$ measured by the sensor of the physical parameter of the device is normal or not for the value $x_{exec}$ of the operation parameter of said device.

11. An equipment for estimating whether a value ($y_{exec}$) measured by a sensor of a physical parameter of a device is normal for a value ($x_{exec}$) of an operation parameter of said device, comprising:
a processor;
a data storage which stores in a database a plurality of pairs $(x_i;y_i)_{i\in[1,n]}$ each defining a reference value $y_i$ of the physical parameter for a value $x_i$ of an operation parameter; and
an interface device,
wherein the processor is configured to:
calculate on the basis of a regression model related to said plurality of pairs $(x_i;y_i)_{i\in[1,n]}$ an estimated value $\hat{y}_{exec}$ of the physical parameter for the value $x_{exec}$ of the operation parameter, the estimated value ($\hat{y}_{exec}$) of the physical parameter being different for a different value ($x_{exec}$) of the operation parameter;
calculate a related residual ($res_{exec}$) based on the estimated value ($\hat{y}_{exec}$) of the physical parameter for the value ($x_{exec}$) of the operation parameter;
calculate on the basis of a variance model related to said plurality of pairs $(x_i;y_i)_{i\in[1,n]}$ an estimated value ($\widehat{var}$) of a variance of the physical parameter for the value ($x_{exec}$) of the operation parameter;
calculate an anomaly score ($Z_{score}$) of the measured value ($y_{exec}$) on the basis of the residual ($res_{exec}$), the estimated variance value ($\widehat{var}$), and a mean residual value (mean) for said plurality of pairs $(x_i;y_i)_{i\in[1,n]}$;
compare the anomaly score ($Z_{score}$) of the measured value ($y_{exec}$) with a standard deviation threshold ($\sigma$);
transmit an alarm signal on the interface device signaling the measurement as abnormal when the anomaly score ($Z_{score}$) is higher than said threshold ($\sigma$); and
shut down a test bench comprising the sensor in response to signaling the measurement is abnormal.

12. The equipment according to claim 11, wherein the processor is further configured to:
determine said regression model related to said plurality of pairs $(x_i;y_i)_{i\in[1,n]}$ by a regression modelling the value y of the physical parameter on the basis of the value x of the operation parameter from the set $\{x_i; y_i\}_{i\in[1,n]}$, where $x_i;y_i$ designates the values of a pair stored in the database;
calculate for each of the pairs $\{x_i;y_i\}_{i\in[1,n]}$ an estimated value ($\hat{y}_i$) of the physical parameter and a residual ($res_i$) being related to each other;
calculate the mean (mean) of said residuals ($res_i$);
calculate on a w-sized sliding window a set of values $(var_j)_{j\in[1,n-w+1]}$ of residual variance, each related to a value ($x_j$) of the operation parameter of a pair $(x_j;y_j)_{j\in[1,n-w+1]}$; and
determine said variance model related to said plurality of pairs $(x_i;y_i)_{i\in[1,n]}$ by a regression modelling var on the basis of x from the set $\{x_j;var_j\}_{j\in[1,n-w+1]}$, where $var_j$ designates a calculated residual variance value and $x_1$ the value of the related operation parameter.

13. A system comprising:
the equipment according to claim 11; and
the test bench comprising the sensor and adapted to receive the device, wherein
the equipment estimates whether the value ($y_{exec}$) measured by the sensor of the physical parameter of said device is normal or not for the value ($x_{exec}$) of the operation parameter of said device.

* * * * *